United States Patent
Bose et al.

(10) Patent No.: US 6,725,540 B2
(45) Date of Patent: Apr. 27, 2004

(54) METHOD FOR REPAIRING TURBINE ENGINE COMPONENTS

(75) Inventors: Sudhangshu Bose, Manchester, CT (US); Alan D. Cetel, West Hartford, CT (US); Peter J. Draghi, Simsbury, CT (US); Norman Pietruska, Durham, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/094,702

(22) Filed: Mar. 9, 2002

(65) Prior Publication Data

US 2003/0167636 A1 Sep. 11, 2003

(51) Int. Cl.⁷ .................................................. B23P 15/00
(52) U.S. Cl. .................. 29/889.1; 29/889.7; 29/402.06; 29/402.13; 29/402.18
(58) Field of Search .......................... 29/889.1, 889.7, 29/402.04, 402.05, 402.06, 402.08, 402.13, 402.18; 427/140

(56) References Cited

U.S. PATENT DOCUMENTS

| | | | | | |
|---|---|---|---|---|---|
| 5,783,318 A | * | 7/1998 | Biondo et al. | .............. | 428/680 |
| 5,794,338 A | * | 8/1998 | Bowden et al. | ............. | 29/889.1 |
| 5,972,424 A | * | 10/1999 | Draghi et al. | ................ | 427/142 |
| 6,339,878 B1 | * | 1/2002 | Owen et al. | ................ | 29/889.1 |
| 6,490,791 B1 | * | 12/2002 | Surace et al. | .............. | 29/889.1 |
| 2002/0076573 A1 | * | 6/2002 | Neal et al. | .................. | 428/621 |
| 2002/0194733 A1 | * | 12/2002 | Surace et al. | .............. | 29/889.1 |
| 2003/0037436 A1 | * | 2/2003 | Ducotey et al. | ........... | 29/889.1 |

* cited by examiner

*Primary Examiner*—I Cuda Rosenbaum
(74) *Attorney, Agent, or Firm*—Bachman & LaPointe, P.C.

(57) ABSTRACT

The present invention relates to a method for repairing turbine engine components, such as vanes and blades, which have airfoils. The method broadly comprises removing oxidation debris from portions of the component by blending areas exhibiting thermal barrier coating spall and/or oxidation damage, removing a ceramic insulating layer from the component, and blending surfaces of the component where nicks, dents, and/or cracks are located. If the component has a depleted aluminum zone, the depleted zone is either removed or replenished. Further, a tip portion of the component, if damaged, is restored and tip abrasives are applied to restore the component's cutting ability. Thereafter, a ceramic coating is applied to the component.

22 Claims, No Drawings

METHOD FOR REPAIRING TURBINE ENGINE COMPONENTS

BACKGROUND OF THE INVENTION

The present invention relates to a method for repairing turbine engine components, such as blades and vanes which have airfoils.

Thermal barrier coatings are used on turbine engine components, particularly airfoils, to reduce the metal temperatures and thereby extend the life of the components. Traditionally, thermal barrier coatings are bi-layer systems. A metallic coating called a bond coat, usually MCrAlY with hafnium and silicon or a diffusion aluminide, is applied to a superalloy substrate portion of the component, usually a nickel based or cobalt based superalloy substrate, as the first layer. The bond coat provides oxidation and corrosion protection. An insulating ceramic layer, usually 7 wt % yttria partially stabilized zirconia, is then deposited on the bond coat. The bond coat is typically needed because the underlying nickel based or cobalt based superalloy substrate used in many turbine engine components does not have adequate oxidation resistance.

Recently, a new group of superalloys have been developed that exhibit sufficient overall oxidation resistance. These include but are not limited to a nickel based superalloy containing oxygen active elements such as yttrium and a nickel based superalloy containing reduced sulfur. For turbine engine components formed from these superalloys, the bond coat is eliminated and the ceramic insulating layer is directly deposited on the substrate. Before being approved for service, the components formed from these new superalloys are processed to improve adherence of the ceramic material to the substrate alloy. Components of this type exhibit improved thermal barrier coating spall lives.

Despite these latest developments, turbine hardware components, such as the airfoil portions of blades and vanes, will develop spall and oxidation debris on one or more surfaces. Additionally, the turbine engine components will develop cracks, nicks and dents during use as a result of the extreme environment in which they operate. It becomes necessary to regularly remove the components from a turbine engine after a period of time and refurbish them to remove any spall, oxidation debris, cracks, nicks, and/or dents.

In prior repair techniques, the ceramic insulating layer was removed before any other step. As a result, it was difficult to identify those portions of the turbine engine components where oxidation and/or spall had been located. This has been found to be highly undesirable because portions of the component which require repair are too easily missed.

SUMMARY OF THE INVENTION

Accordingly, it is an object of the present invention to provide an improved method for repairing turbine engine components.

It is a further object of the present invention to provide a repair method as above which can be used to repair a wide variety of turbine engine components.

The foregoing objects are attained by the repair method of the present invention.

In accordance with the present invention, a method for repairing a turbine engine component having an insulating ceramic layer broadly comprises removing oxidation debris on the turbine engine component, removing the ceramic layer from the turbine engine component, and thereafter blending exposed portions of the turbine engine component to remove nicks, dents, and/or cracks. The method further comprises removing or replenishing zones depleted in aluminum. Still further, the method comprises restoring a tip of the turbine engine component and thereafter applying tip abrasives to restore cutting ability. Finally, a ceramic coating is applied to the repaired turbine engine component.

Other details of the repair method of the present invention, as well as other objects and advantages attendant thereto, are set forth in the following detailed description.

DETAILED DESCRIPTION OF THE PREFERRED EMBODIMENT(S)

The repair method of the present invention may be performed on a wide variety of turbine engine run components including, but not limited to, blades and vanes having airfoil portions. The components may be those which are covered by both a bi-layer thermal barrier coating that includes a bond coat and a ceramic insulating layer or those which are just covered by a ceramic insulating layer.

The repair method begins with identification of those areas on a particular component with any thermal barrier coating spall or oxidation, such as the leading and trailing edges of the component, e.g. the leading and trailing edges of an airfoil portion. These areas are lightly blended, preferably by hand, to remove any oxidation debris and to smooth each damaged area. Any suitable manual blending technique known in the art may be used to perform this initial step.

Following the blending operation, the ceramic insulating layer is removed from the component. The ceramic layer removal may be carried out by various methods such as exposure to high pressure alkali solution in an autoclave, grit blasting, or using a waterjet. Grit blasting using 240 alumina grit is a preferred approach for removing the ceramic layer because it is less time consuming, economically beneficial, and can be performed anywhere. If one chooses to use an approach which exposes the component to high pressure alkali solution in an autoclave, a 45% caustic potash solution at a pressure of 275 to 425 psi and a temperature of 400° F. to 480° F. may be used. If one chooses to use a waterjet to remove the ceramic layer, the waterjet should not contain an abrasive grit.

Following removal of the ceramic layer, surfaces of the component, such as airfoil and/or platform surfaces, are lightly blended to remove nicks, dents, and cracks. One area where such cracks are likely to occur is the trailing edge of the component, such as the trailing edge of the airfoil. The blending is again preferably done manually using any suitable manual technique known in the art.

During engine exposure, several key elementary processes occur in the superalloy forming the component substrate and the ceramic coating. At the alloy-ceramic coating interface, a protective alumina scale develops during thermal barrier coating processing. The protective alumina scale grows during engine exposure. Aluminum needed for growth of the scale comes from the alloy immediately below the scale. As a result, an aluminum depleted zone forms in the alloy immediately below the protective alumina scale. Further depletion may occur after the thermal barrier coating spalls, raising the local temperature. The bare alloy is exposed to additional oxidation. This depleted zone may be up to 0.002 inches in thickness; however, it may grow further with additional oxidation exposure. For certain components which exhibit this depleted zone, the repair method of the present invention further involves removing the depleted zone or replenishing the depleted zone with more aluminum so that the surface of the repaired alloy substrate will continue to form the protective alumina scale.

If it is chosen to remove the depleted zone, this removal may be accomplished by either belting the surface of the component with abrasive grinding, grit blasting with abrasive powder such as alumina, or by an electrochemical process wherein the component is dipped into an acid bath.

If it is chosen to restore the depleted zone, locally depleted zones may be rejuvenated by raising aluminum levels through the application of aluminum containing coatings of appropriate composition followed by a diffusion treatment. The particular coating to be applied to a particular component is a function of the alloy forming the component substrate and should be selected such that the alloy has the ability to retain strength and reform a protective alumina scale. The diffusion treatment to be carried out after application of the coating composition is a function of the type of coating composition which is utilized and may comprise any suitable diffusion treatment known in the art. A typical diffusion treatment comprises heating the component after application of the aluminum containing coating to a temperature of 1800° F. to 2000° F. for a time period in the range of 4 hours to 20 hours.

The repair method further involves restoration of the tip of the component, such as the tip of a blade or vane. Frequently, blades or vanes have a mini-squealer section. The mini-squealer if present is to be scarf ground. Thereafter, the tip is ground to a minimum cap thickness. The scarf grinding and the tip grinding may be carried out using any suitable technique known in the art.

After the tip has been ground, it typically needs to be welded with weld materials, such as cobalt-based, aluminum containing or nickel based, aluminum containing weld materials, to restore it to its original shape. The welding step may be carried out using any suitable welding technique known in the art. Following welding, the tip is polished to smooth the tip surface and is subjected to a stress relief heat treatment. The particular stress relief treatment used is a function of the alloy forming the component and the weld material which is used.

After the tip has been inspected, tip abrasives may be applied to the welded tip to restore the tip's cutting ability. The tip abrasives may be cubic boron nitride particles which are applied electrolytically to the welded tip. While it is preferred to apply cubic boron nitride particles to the tip, other abrasives may be applied if desired.

After the component tip has been restored, the component is subjected to a heat treatment at a temperature of 1900° F. to 2050° F. in a hydrogen atmosphere at a fixed dewpoint of −40° F. for a time period in the range of 1 hour to 8 hours.

Following the heat treatment, a ceramic coating, such as a 7 wt % yttria stabilized zirconia coating, is applied to the component. The ceramic coating may be applied using any suitable technique known in the art. Typically, such techniques involve a heat treatment subsequent to the application of the ceramic coating, which heat treatment is a function of the particular type of ceramic coating which is applied.

As can be seen from the foregoing description, a repair method has been provided which effectively and efficiently repairs turbine engine hardware components.

It is apparent that there has been provided in accordance with the present invention a method of repairing turbine engine components which fully satisfies the objects, means and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A method for repairing a turbine engine component having an insulating ceramic layer thereon, said method comprising the steps of:
   removing oxidation debris from at least one portion of said component;
   removing said ceramic layer; and
   blending at least one surface of said component to remove at least one of nicks, debris, and cracks.

2. A repair method according to claim 1, wherein said oxidation debris removing step comprises manually blending areas exhibiting thermal barrier coating spall or oxidation.

3. A repair method according to claim 1, wherein said turbine engine component comprises a vane having a leading edge, a trailing edge, and an airfoil, a platform and wherein said oxidation debris removing step comprises blending areas on said leading edge with thermal barrier coating spall.

4. A repair method according to claim 3, wherein said blending is done by hand.

5. A repair method according to claim 3, wherein said blending step comprises blending at least one surface of at least one of said airfoil and said platform by hand.

6. A repair method according to claim 1, wherein said ceramic layer removing step comprises removing said ceramic layer using a high pressure alkali solution in an autoclave.

7. A repair method according to claim 1, wherein said ceramic layer removing step comprises removing said ceramic layer by grit blasting.

8. A repair method according to claim 1, wherein said ceramic layer removing step comprises removing said ceramic layer using a waterjet.

9. A repair method according to claim 1, wherein said component has a depleted aluminum zone and said repair method further comprises removing said depleted aluminum zone.

10. A repair method according to claim 9, wherein said depleted zone removing step comprises removing said depleted zone by abrasive grinding.

11. A repair method according to claim 9, wherein said depleted zone removing step comprises removing said depleted zone by abrasive powder grit blasting.

12. A repair method according to claim 9, wherein said depleted zone removing step comprises removing said depleted zone using an electrochemical process.

13. A repair method according to claim 1, wherein said component has locally depleted aluminum zones and said method further comprises rejuvenating said locally depleted aluminum zones by raising aluminum levels.

14. A repair method according to claim 13 wherein said rejuvenating step comprises applying an aluminum containing material to a surface of said component where said locally depleted aluminum zones are located and diffusing said aluminum containing material into said surface.

15. A repair method according to claim 1, further comprising restoring a tip of said component.

16. A repair method according to claim 15, wherein said tip has a mini-squealer and said restoring step comprises scarf grinding said mini-squealer portion.

17. A repair method according to claim 15, wherein said tip restoring step comprises grinding said tip to a minimum cap thickness.

18. A repair method according to claim 17, further comprising applying a weld material to said tip and heat treating said tip with said applied weld material.

19. A repair method according to claim 18, further comprising applying an abrasive material to said welded tip.

20. A repair method according to claim 1, further comprising heat treating said repaired component and thereafter applying a ceramic coating layer to said component.

21. A method for repairing a turbine engine component having an insulating ceramic layer thereon, said method comprising the steps of:

removing oxidation debris from at least one portion of said component;

removing said ceramic layer after said oxidation debris removing step; and subsequent to said ceramic layer removing step, blending at least one surface of said component to remove at least one of nicks, debris, and cracks.

22. A method for repairing a turbine engine component having an insulating ceramic layer thereon, said method comprising the steps of:

identifying those areas on said component having at least one of thermal barrier coating spall and oxidation debris;

removing said debris from said areas;

removing said ceramic layer after said debris removing step; and blending at least one surface of said component to remove at least one of nicks, debris, and cracks.

* * * * *